(12) United States Patent
Sigworth, Jr. et al.

(10) Patent No.: US 8,904,792 B2
(45) Date of Patent: Dec. 9, 2014

(54) METHOD AND SYSTEM FOR STORING ENERGY AND GENERATING POWER HEAT IN A SUBSEA ENVIRONMENT

(75) Inventors: Harrison W. Sigworth, Jr., San Ramon, CA (US); Trevor N. Demayo, El Sobrante, CA (US); Yaofan Yi, Hercules, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 811 days.

(21) Appl. No.: 13/101,713

(22) Filed: May 5, 2011

(65) Prior Publication Data

US 2012/0279222 A1 Nov. 8, 2012

(51) Int. Cl.

| F01K 1/00 | (2006.01) |
| F02C 1/04 | (2006.01) |
| F02B 21/02 | (2006.01) |
| F02D 29/06 | (2006.01) |

(52) U.S. Cl.
CPC ............... *F02B 21/02* (2013.01); *F02D 29/06* (2013.01); *Y02E 10/34* (2013.01)
USPC .................................. 60/659; 60/650; 60/682

(58) Field of Classification Search
USPC .............................. 60/616, 618, 659; 405/210
See application file for complete search history.

(56) References Cited

U.S. PATENT DOCUMENTS

| 3,469,627 A * | 9/1969 | Baker .......................... 166/356 |
| 3,610,194 A | 10/1971 | Siegel |
| 3,621,911 A * | 11/1971 | Baker et al. ..................... 166/336 |
| 3,808,779 A * | 5/1974 | Randall ............................... 56/9 |
| 3,996,741 A * | 12/1976 | Herberg .......................... 60/398 |
| 4,031,705 A * | 6/1977 | Berg ............................... 60/615 |
| 4,095,421 A | 6/1978 | Silcox |
| 4,112,687 A * | 9/1978 | Dixon .......................... 60/641.6 |
| 4,326,132 A | 4/1982 | Bokel |
| 4,383,182 A | 5/1983 | Bowley |
| 4,742,242 A | 5/1988 | De Shon |
| 4,850,190 A | 7/1989 | Pitts |
| 4,873,828 A * | 10/1989 | Laing et al. ..................... 60/659 |
| 5,448,889 A * | 9/1995 | Bronicki .................... 60/641.14 |
| 6,313,545 B1 | 11/2001 | Finley et al. |
| 6,756,695 B2 | 6/2004 | Hibbs et al. |
| 6,863,474 B2 * | 3/2005 | Webster et al. ............... 405/210 |
| 7,043,920 B2 | 5/2006 | Viteri et al. |
| 7,663,255 B2 | 2/2010 | Kim et al. |
| 7,963,335 B2 | 6/2011 | Krehbiel et al. |
| 2009/0094988 A1 | 4/2009 | Dunn |
| 2010/0326069 A1* | 12/2010 | Fong et al. ...................... 60/415 |

FOREIGN PATENT DOCUMENTS

| JP | 2895937 | 5/1999 |
| WO | WO03059751 | 7/2003 |

* cited by examiner

*Primary Examiner* — Christopher Jetton
(74) *Attorney, Agent, or Firm* — Karen R. DiDomenicis; Melissa Patangia

(57) ABSTRACT

Systems and methods are disclosed for storing energy and generating power and/or heat within a subsea environment. The systems and methods utilize stored compressed air within an air storage chamber to drive an engine/generator system in order to generate power. The engine may or may not utilize combustion. Alternatively, the systems and methods utilize stored compressed air to supply air to a combustor to generate heat. The heat generated can be used for variety of purposes, including to generate steam and to heat heavy oil.

14 Claims, 5 Drawing Sheets

FIG. 2C

METHOD AND SYSTEM FOR STORING ENERGY AND GENERATING POWER HEAT IN A SUBSEA ENVIRONMENT

BACKGROUND

The invention relates to methods and systems for storing energy and generating power and/or heat in a subsea environment such as on an ocean floor or within an offshore oil well.

Providing the power necessary for many subsea oil and gas extraction and processing operations can be very expensive and is in some cases impractical. For example, in locations where there are no deep ocean currents, where the recovery of wave or tidal energy at the ocean surface is impractical or where the ocean surface is iced over for part of the year, the only practical means for providing power to many subsea operations such as those carried out by equipment on the ocean floor is to provide long and expensive subsea cables to the equipment. Where power is needed far offshore, the cables are typically connected to an offshore platform.

It would be desirable to have a system and method for supplying power and/or heat in a remote subsea environment while avoiding the aforementioned difficulties.

SUMMARY

In one embodiment, a system is provided for generating power in a subsea environment. The system includes:
   a. a compressed air storage chamber in fluid communication with a compressed air source;
   b. an outer shell located on the ocean floor enclosing a portion of the compressed air storage chamber; and
   c. an engine having an inlet in fluid communication with the compressed air storage chamber and an exhaust port.

In a second embodiment, a system is provided for generating heat in a subsea environment. The system includes:
   a. a compressed air storage chamber in fluid communication with a compressed air source;
   b. an outer shell located on the ocean floor enclosing a portion of the compressed air storage chamber;
   c. a combustor for combusting an air-fuel mixture thereby generating heat, the combustor having a first inlet in fluid communication with the compressed air storage chamber, a second inlet for supplying a gaseous or liquid fuel, and an exhaust port; and
   d. a boiler or heat exchanger in heat exchange relation with the combustor for transferring heat generated by the combustor to a heat exchange fluid.

In a third embodiment, a method is provided for generating power and/or heat in a subsea environment, which includes providing air from a compressed air storage chamber within an outer shell located on the ocean floor to an engine coupled with a power generator or a combustor in heat exchange relation with a boiler or heat exchanger.

In a fourth embodiment, a method is provided for generating heat or steam in a subsea environment, the method including the following steps:
   a. providing air from a compressed air storage chamber within an outer shell located in a subsea environment to an engine, combustor or steam generator;
   b. delivering a fuel to the engine, combustor or steam generator; and
   c. combusting a mixture of the air and the fuel in the engine, combustor or steam generator thereby generating heat or steam.

DETAILED DESCRIPTION

The methods and systems described herein are useful for storing energy and generating power and/or heat in a subsea environment, particularly a remote environment in which conventional means of supplying power and/or heat can be particularly difficult. By "subsea environment" is meant an environment located beneath the surface of a body of water, including environments between the ocean surface and the ocean floor, locations on the ocean floor and subterranean environments beneath the ocean floor, such as, for example, within an offshore oil producing well.

In one embodiment, energy which can be converted to power on an as needed basis is stored by compressing air and storing the air in a compressed air storage chamber located in a subsea environment. Air can be stored in the compressed air storage chamber at near constant pressure because of the hydrostatic pressure at depth, and can be provided from the chamber at a desired rate to drive an engine which can be coupled to a power generator. Alternatively, for heat generation, the air can be provided to a burner or combustion chamber, herein referred to as a "combustor," which can provide heat to a boiler or heat exchanger. Throughout this specification, the term "combustor" is used commonly to refer to a combustion chamber in which air or other oxidant and fuel are combined and combusted, either for purposes of providing power to a turbine or providing heat to equipment such as boilers, process heaters or steam generators. For convenience, the compressed air storage chamber is preferably located on and anchored to the ocean floor, also referred to herein as the seabed. The compressed air storage chamber is in constant or intermittent fluid communication with a compressed air source, such as an air source found on a surface vessel or an offshore platform.

The compressed air storage chamber, also referred to herein interchangeably as the air storage chamber or the chamber, can be at least partly contained by an outer shell or housing which can be located on the ocean floor and preferably securely anchored in place. The outer shell can be formed of a suitably durable material which contains the compressed air and protects a portion (typically the upper portion) of the air storage chamber. Examples of suitable materials can include carbon steel or a suitable alloy.

The compressed air storage chamber is partially enclosed by a flexible diaphragm capable of maintaining near constant air pressure within the compressed air storage chamber as air is provided from the air storage chamber. The diaphragm keeps the air within the air storage chamber at prevailing water pressures at depth. Water pressure outside the chamber is balanced with the stored air pressure within the chamber, such that as stored air volume decreases, air pressure remains nearly constant. The diaphragm can be formed of any suitable flexible, durable material, such as, for example, polychloroprene rubber and the like. The compressed air storage chamber can be partially enclosed by a rigid or semirigid material, such as, for example, steel or suitable alloy. The rigid or semirigid enclosure may or may not be integral with the outer shell.

Air from the air storage chamber can be provided from the air storage chamber through an air outlet port which is in fluid communication with an engine. The engine can be of any type which utilizes air expansion to generate motion, as in, for example, the rotation of an axis within a power generator. In one embodiment, an air engine is used. The air engine can be, for example, a turbine type or vane type engine. This embodiment is also referred to herein as the "non-combustion case."

In certain embodiments, also referred to herein as the "combustion case," a combustion engine or combustor is used with the air providing an oxidant for fuel combustion. The combustion engine can be a positive displacement or turbine type engine. The combustion engine can utilize gaseous or liquid fuel. The fuel for combustion can be supplied from separate fuel storage facilities or from produced hydrocarbons downstream of product separation. Modeling suggests that the system embodiment using a combustion engine can improve the power output by an order of magnitude as compared with the system embodiment using an air engine without combustion, and is capable of providing megawatt-scale power output. The combustion engine can be a high pressure gas turbine or positive displacement engine or the like, depending on the quality of the fuel available. A thermoelectric generator or Stirling engine could be used with a combustion heat source. A combustor can be used in conjunction with a boiler or heat exchanger, in which case the heat of combustion of an air-fuel mixture is used to create steam or heat a heat transfer fluid. In such embodiment, the combustor can also be referred to as a "burner."

The combustion engine or combustor has an exhaust port in fluid communication with an exhaust line to exhaust the products of combustion, namely water and exhaust gases. In one embodiment, the engine exhaust is directed through a flexible but non-collapsible conduit. In the non-combustion case, the power output of the engine is directly related to the differential pressure between the ocean water pressure at the storage depth and the lower pressure at the exhaust pipe outlet. In the combustion case, the added differential improves engine output and efficiency. Engine performance can be improved by using longer exhaust pipe lengths, exhausting at shallower depths, i.e. closer to the water surface.

To avoid the detrimental effects of ice formation and very cold temperatures as the air is expanded through the engine in the non-combustion case, the supplied air is preferably dry. It may be preferred to employ equipment such as electric heaters and interstage heat exchange from the water at depth at various points within the system as could easily be determined by one skilled in the art.

Optionally, the exhaust line can be insulated and/or heated via heat tracing to prevent substantial accumulation of water condensation within the exhaust line. The exhaust line can also optionally be tied into a produced fluids production line so that exhaust gas from the engine can be directly injected into and removed via the production line. In such case, a long heated exhaust line would not be necessary.

In one embodiment, the engine is coupled to a power generator such that the motion generated by the engine drives the power generator.

The compressed air storage chamber is replenished with air to compensate for air exiting the chamber over time. The chamber can have an inlet port which can be connected to a compressed air supply line for the purposes of refilling the compressed air storage chamber with air over time. The connection can be either permanent or detachable. The refilling of air can be either continuous or intermittent (also referred to as periodic) as appropriate for a given system. When intermittent refilling is used, it is envisioned that the chamber will be refilled periodically at a frequency between every few weeks and every several months. In one embodiment, an air supply connection is established with the air storage chamber directly via an air refill port. In another embodiment, an air supply connection is established with the exhaust pipe outlet to replenish the air within the chamber through the exhaust line. In this embodiment, reverse-pressure valves are preferably employed to bypass the engine while the air storage chamber is being refilled.

Figure 1:
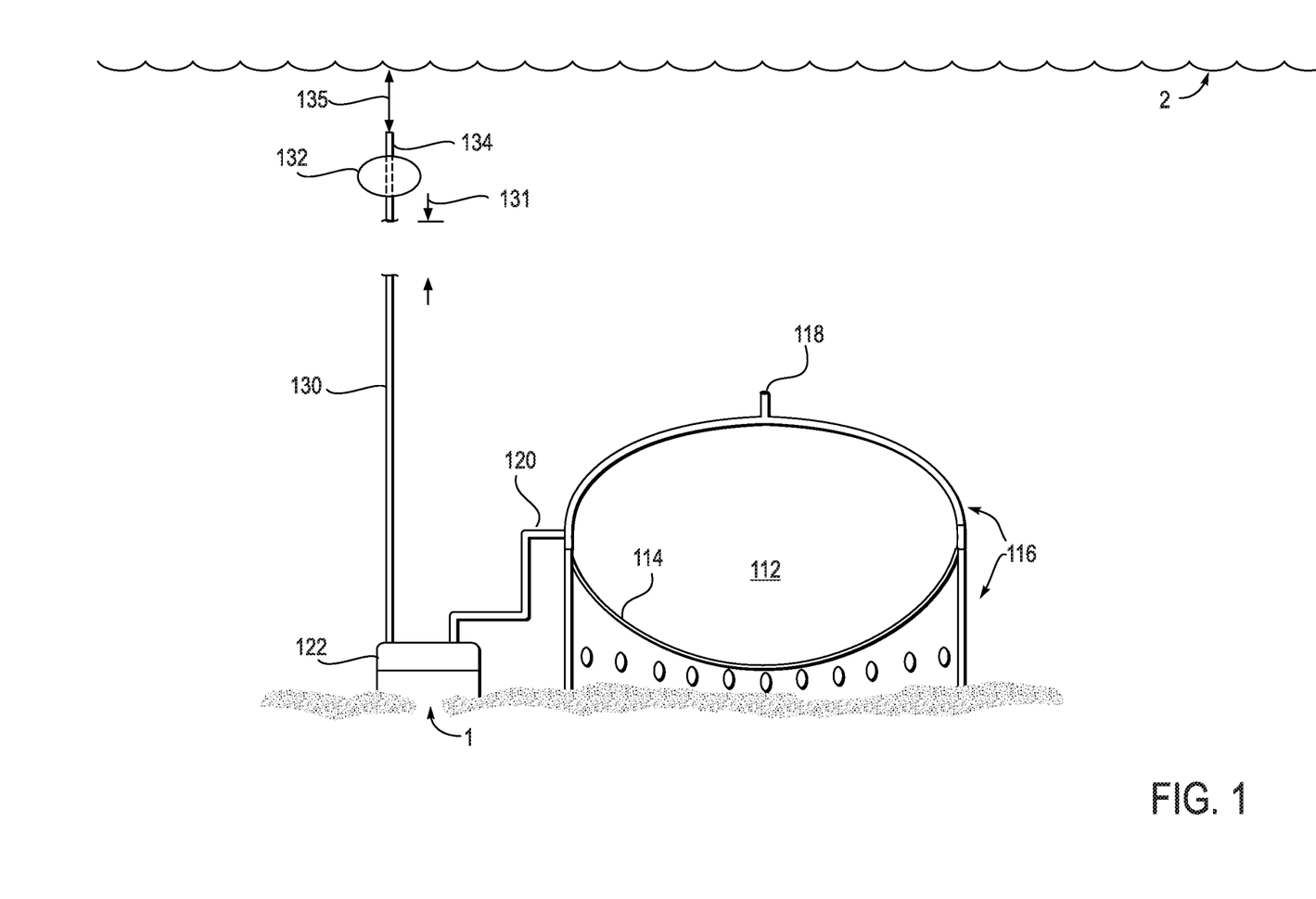
FIG. 1 illustrates a system for storing energy and generating power and/or heat in a subsea environment according to one embodiment.

FIG. 1 illustrates a system according to one embodiment. Air storage chamber 112 resides within a rigid outer shell 116 located on the seabed 1. The air storage chamber 112 is partially enclosed by flexible diaphragm 114 and partially enclosed by rigid outer shell 116. In one embodiment, the air storage chamber can be refilled through refill port 118. In an alternate embodiment, the air storage chamber can be refilled through exhaust line 130.

Compressed air can be provided from the air storage chamber 112 through the compressed air line 120 which supplies the air to engine/combustor unit 122. The air is used either by an engine within the engine/combustor unit 122 to drive a generator thus generating power, or by a combustor within the engine/combustor unit 122 to generate heat for use by a boiler or heat exchanger (not shown). Engine exhaust can be exhausted through the exhaust port 134 at the end of exhaust line 130. The exhaust port 134 is preferably below the water surface 2. A flotation buoy 132 can be attached to the exhaust line to keep tension on the line. Depending on the length of the exhaust line and the depth of the ocean, distances 131 and 135 can vary widely, up to thousands of feet.

Figure 2A:
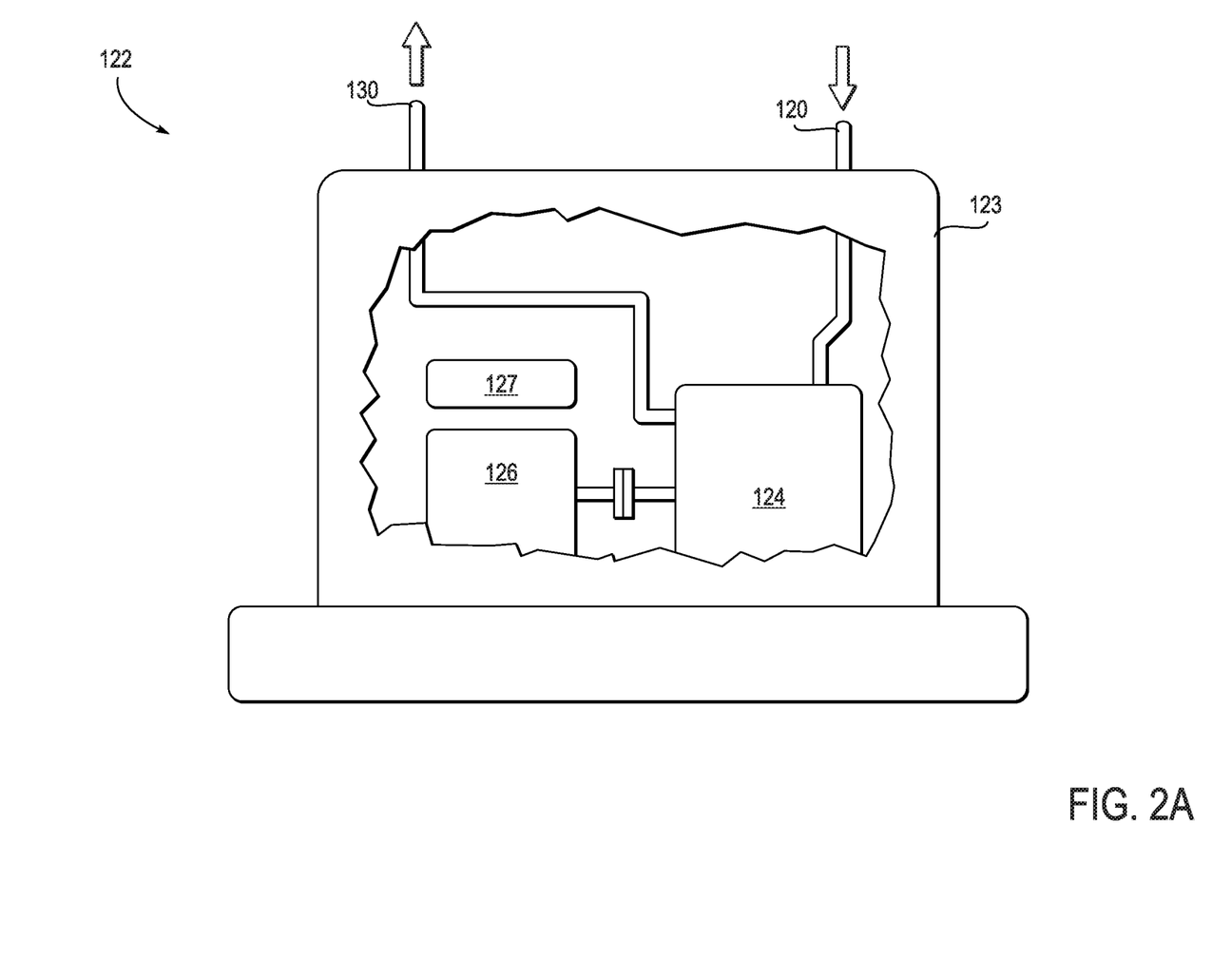
FIGS. 2A and 2B illustrate two alternative embodiments for generating power.

FIG. 2A illustrates the side view of engine/combustor unit 122 utilizing an air engine without combustion. Air coming from compressed air line 120 enters air engine 124 which is coupled to generator 126. Exhaust from the engine 124 exhausts through line 130. Control and power conditioning equipment used to control the system and regulate the quality of the electric power 127 are also associated with the engine. Such equipment is known and would be selected by one skilled in the art. The engine, generator and associated controls are located on the ocean floor within protective housing 123.

Figure 2B:
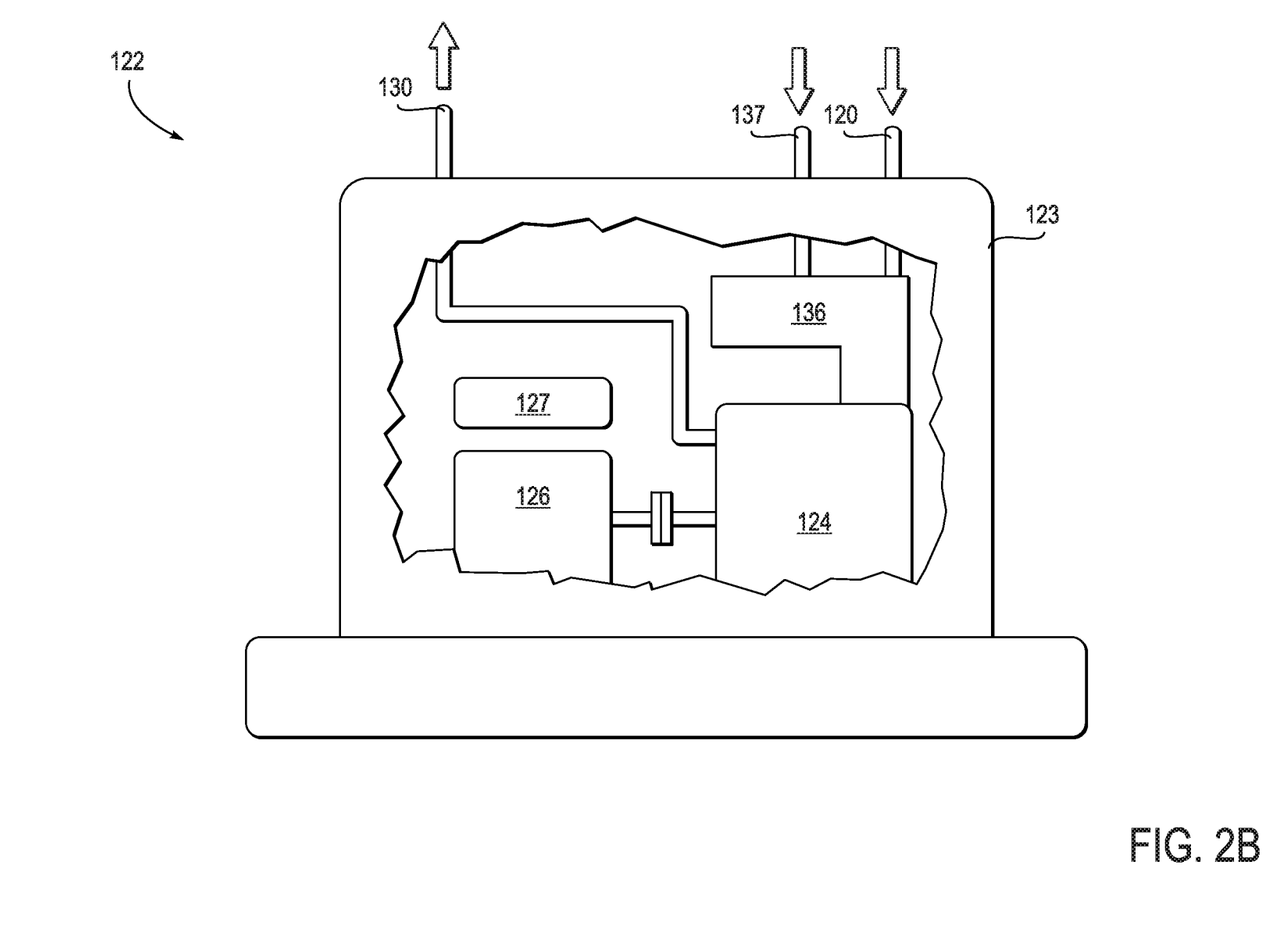

FIG. 2B illustrates the side view of engine/combustor unit 122 utilizing a combustion engine. Air coming from compressed air line 120 enters a combustor 136.

Fuel enters the combustor through fuel line 137. The gases from the combustor are expanded through engine 124 which is coupled to generator 126. Exhaust from the engine 124 exhausts through line 130. Controls and power conditioning equipment 127 are also associated with the engine. The combustor, engine, generator and associated controls are located on the ocean floor within protective housing 123.

Electric and/or shaft power in moderate and relatively large amounts, i.e., on the order of a megawatt, can be generated using embodiments disclosed herein. The power generated can be used to run subsea equipment used in oil and gas exploration and production activities as would be apparent to one skilled in the art. For instance, in one embodiment, electric power can be used for supervisory control and data acquisition (SCADA) systems and electric motor-driven equipment. Mechanical power can also be used directly to drive compressors and pumps. The power can also be applied downhole, i.e., within a production reservoir, for instance to drive submersible pumps.

In another embodiment, a system is provided including a compressed air storage chamber as previously described; however, rather than supplying air to an engine located on the seabed, the compressed air is supplied to an submersible pump motor located at or near the bottom of an offshore oil-producing well. In such an embodiment, the motor can replace the conventional electric motor in the submersible pump generally used in oil-producing wells. The pump motor can be either air- or combustion-driven.

In other embodiments, energy provided by the system and method embodiments described herein can be used for generating heat in addition to or rather than power. The compressed air storage chamber supplies air for combustion of fuel in combustors or steam generators. The combustors or steam generators can be located on the ocean floor or near or at the bottom of an offshore well. Air is provided from the air storage chamber to the combustor or steam generator. Air is mixed with a fuel and combusted, generating heat which can be used to generate steam. The steam can be used for a variety of purposes, including but not limited to thermally enhanced hydrocarbon recovery, for heating heavy oil in deep undersea wells, for providing heat for steam for ocean floor separation or process flow assurance, or other uses as would be apparent to one skilled in the art. Heavy oil can be heated in order to improve the pumpability or separation processing of the oil. Alternatively, the heavy oil can be heated as part of an enhanced oil recovery process.

Figure 2C:
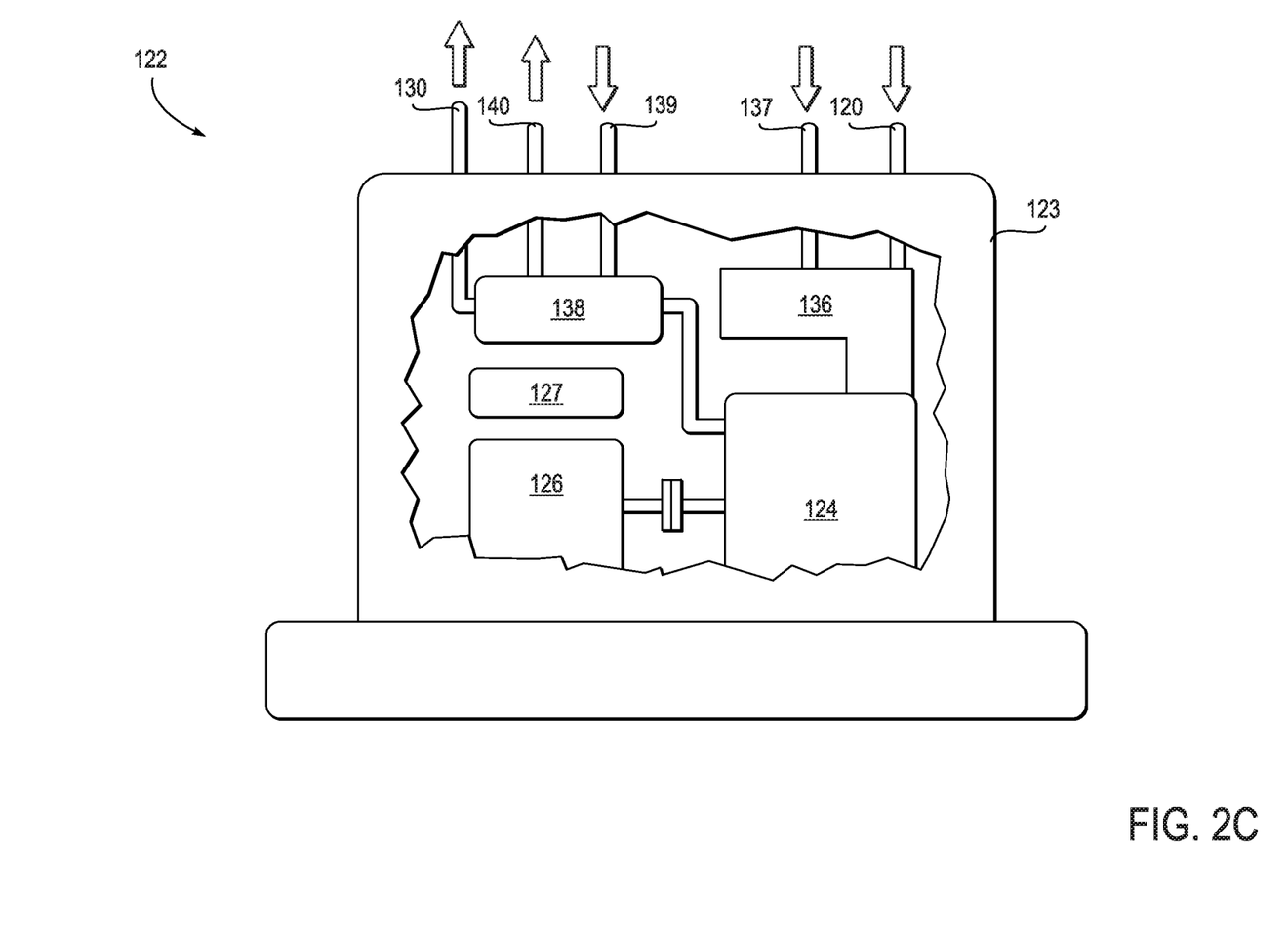
FIG. 2C illustrates an embodiment for generating power and heat.

FIG. 2C illustrates the side view of engine/combustor unit 122 utilizing a combustion engine as previously described with the addition of a boiler or heat exchanger 138 which utilizes heat from the engine exhaust passing through exhaust line 130 to heat water or other heat transfer fluid. The water or heat transfer fluid is supplied through line 139. Steam or hot heat transfer fluid leaves the boiler or heat exchanger through line 140. The steam or other hot heat transfer fluid can be utilized to provide process heat wherever needed. As would be apparent to one skilled in the art, the water or heat transfer fluid can then be returned via line 139 to be reheated by a boiler or heat exchanger 138.

Figure 2D:
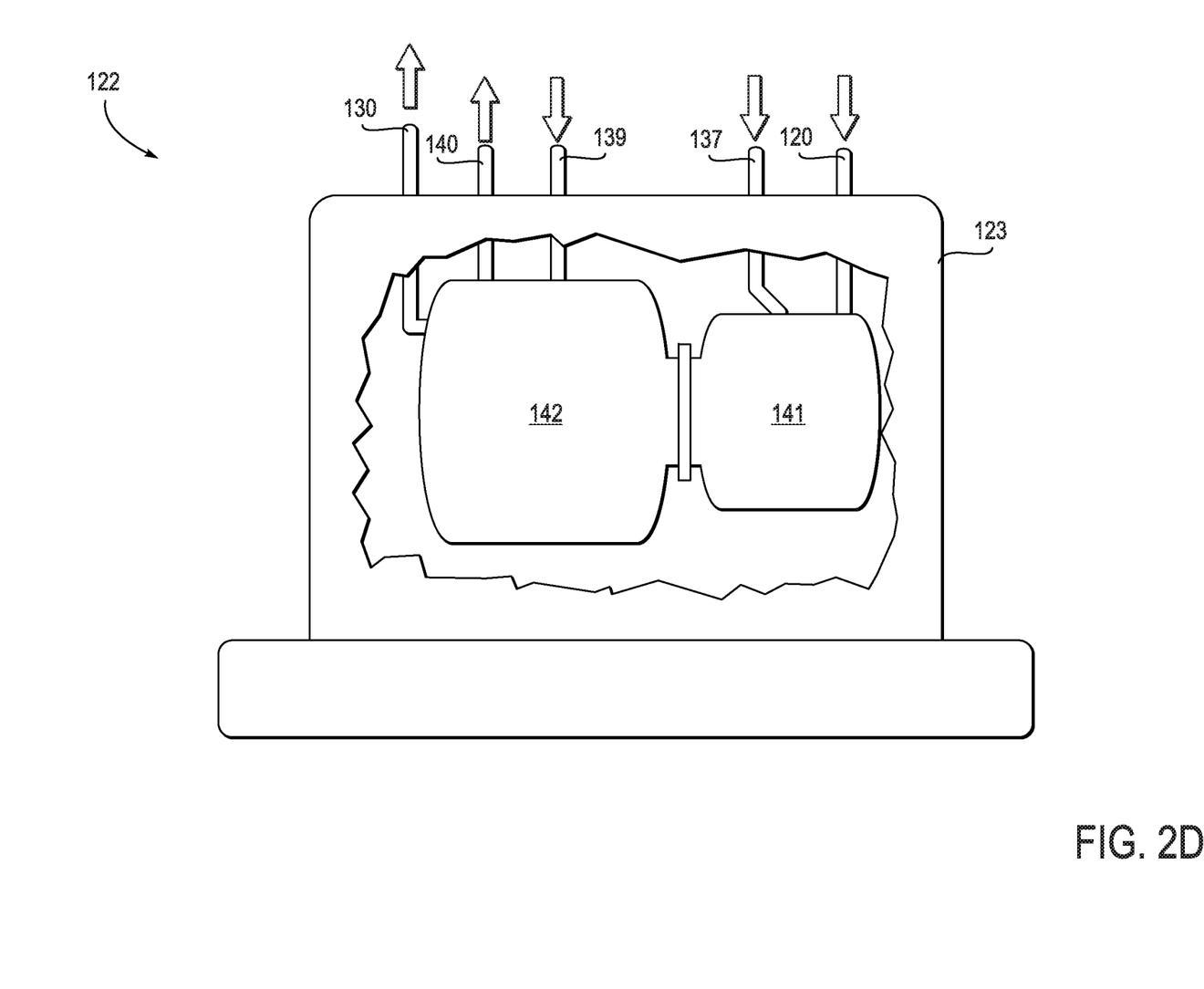
FIG. 2D illustrates an embodiment for generating heat.

FIG. 2D illustrates the side view of combustor/heater unit 122 in which air is supplied through line 120 and fuel is supplied through line 137 to a combustor 141 in heat exchange relation with a boiler or heat exchanger 142. Exhaust from the combustor exhausts through line 130. Water or other heat transfer fluid is supplied to the boiler or heat exchanger 142 through line 139. Steam or other hot heat transfer fluid exits the boiler or heat exchanger through line 140. The steam or other hot heat transfer fluid can be utilized to provide process heat wherever needed. As would be apparent to one skilled in the art, the water or heat transfer fluid can then be returned via line 139 to be reheated by a boiler or heat exchanger 142.

EXAMPLES

Power Generation Using Compressed Air Storage without Air Engine

Example 1

An air storage chamber is assumed to have the equivalent volume of a 60 foot (18.3 m) diameter sphere. The air storage chamber is assumed to operate on the ocean floor at a depth of 10,000 foot (3050 m). The density of the seawater is assumed to be 64.1 lb/ft$^3$ (1.03 g/cc). A 5,000 foot (1500 m) long exhaust pipe is used, exhausting at a depth of 5,000 feet (1500 m) below the ocean surface. A gas turbine air engine system is assumed.

Assuming an air engine/turbine power recovery of 80% of isentropic air expansion work between the same inlet and output pressures and a 95% generator efficiency (76% combined efficiency, air expansion energy to electricity), approximately 4.3 kW of power could be generated continuously between air storage chamber refilling at 100 day intervals. In other words, roughly 10,000 kWh of power can be generated with available air during this interval.

Example 2

Keeping the same assumptions from Example 1 and increasing the exhaust pipe length to 9,900 feet (3000 m) and exhausting at a depth of 100 feet (30 m) below the ocean surface, approximately 8.5 kW of continuous power could be generated. In other words, roughly 20,000 kWh of power can be generated with available air assuming discharge to pressure at 100 feet depth.

Example 3

Keeping all of the assumptions from Example 2 the same and increasing the diameter of the air storage chamber to 100 feet (30 m), approximately 40 kW could be generated continuously over a 100 day period. Substantially greater amounts of power could be provided intermittently or over shorter time periods.

Power Generation Using Compressed Air Storage with Combustion Engine

Example 4

An air storage chamber is assumed to have the equivalent volume of a 60 foot (18.3 m) diameter sphere. The air storage chamber is assumed to operate on the ocean floor at a depth of 10,000 foot (3050 m). A 5,000 foot (1500 m) long exhaust pipe is used exhausting at a depth of 5,000 feet (1500 m) below the ocean surface. In this case, with combustion utilizing a multistage gas turbine and hydrocarbon fuel rather than just air expansion energy, about 48 kW of average power could be generated continuously between air storage chamber refilling at 100 day intervals. Again, 80% of isentropic expansion of the combustion products and 95% electrical generation efficiency are assumed (76% combined efficiency). Assuming stoichiometric combustion, the corresponding hydrocarbon fuel amounts used between air refilling every 100 days would be 3,735 million BTU (29,000 gallons of diesel fuel equivalent or 3800 thousand scf of natural gas) for this example.

Example 5

Keeping the same assumptions from Example 4 and increasing the exhaust pipe length to 9900 feet (3000 m) and exhausting at 100 feet (30 m) below ocean surface, approximately 216 kW of average power could be generated over a 100 day period.

Example 6

Keeping the same assumptions from Example 5 and increasing the diameter of their storage chamber to 100 feet (30 m), approximately 1 MW of power could be generated continuously over a 100 day period. Greater amounts of power could be provided intermittently or over shorter time periods.

As can be seen from these results, shown in Table 1, relatively large amounts of power can be generated using the system including combustion.

Heat Generation Using Compressed Air Storage with Combustion Engine

Example 7

Keeping the same assumptions from Example 6 and replacing the turbine with a boiler or heat exchanger, approximately 4,500 lb/hour superheated steam (at 680° F. (360° C.) and 2000 psia (13.8 MPa)) or 1,500 BTU per second of heat could be generated continuously over a 100 day period. Greater amounts of heat could be provided intermittently or over shorter time periods. Key assumptions and results are shown in Table 1.

Combined Power and Heat Generation Using Compressed Air Storage with Combustion Engine

Example 8

Keeping the same assumptions from Example 6 and adding a boiler or heat exchanger after the turbine, approximately 1 MW of power and 1,700 lb/hour superheated steam (at 680° F. (360° C.) and 2000 psia (13.8 MPa)) or 565 BTU per second of heat could be generated continuously over a 100 day period. Greater amounts of power and heat could be provided intermittently or over shorter time periods. Key assumptions and results are shown in Table 1.

that the methods may vary as to specific steps and sequences, without departing from the basic concepts as disclosed herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

What is claimed is:

1. A system for generating power in a subsea environment, comprising:
    a. a compressed air storage chamber located on the ocean floor in fluid communication with a compressed air source;
    b. an outer shell located on the ocean floor enclosing a portion of the compressed air storage chamber;
    c. an engine located on the ocean floor having an inlet in fluid communication with the compressed air storage chamber;

TABLE 1

|  | Example 3 (Compressed air storage without combustion for power) | Example 6 (Compressed air with combustion for power) | Example 7 (Compressed air with combustion for heat only) | Example 8 (Compressed air with combustion for combined heat and power) |
|---|---|---|---|---|
| Days between refilling air storage chamber | 100 | 100 | 100 | 100 |
| Ocean depth, feet (m) | 10,000 (3050) | 10,000 (3050) | 10,000 (3050) | 10,000 (3050) |
| Storage volume, sphere diameter equivalent, feet (m) | 100 (30) | 100 (30) | 100 (30) | 100 (30) |
| Exhaust depth below ocean surface, feet (m) | 100 (30) | 100 (30) | 100 (30) | 100 (30) |
| Fossil fuel use (nat. gas, million scf) per 100 days | N/A | 18 | N/A | 18 |
| Avg. power output, kW | 40 | 1000 | N/A | 1000 |
| Avg. steam output (at 360° C. and 2000 psia (13.8 MPa)), lb/hour |  |  | 4500 | 1700 |
| Avg. heat output, BTU/second | N/A | N/A | 1,514 | 565 |

The drawings illustrate particular embodiments of the present invention. It will be appreciated that the apparatus may vary as to configuration and as to details of the parts, and d. an exhaust line in fluid communication with the engine and having an exhaust port at the end thereof for removing exhaust gas from the engine, wherein the exhaust port is located below the water surface at a vertical position between the engine and the water surface; and e. a produced fluids production line, wherein the exhaust line is tied into the produced fluids production line so that exhaust gas can be removed by the production line.

2. The system of claim 1, further comprising:

e. a power generator located on the ocean floor driven by the engine.

3. The system of claim 1 wherein the engine is an air engine or a combustion engine.

4. The system of claim 3 wherein the engine is a combustion engine fueled by a gaseous or liquid fuel.

5. The system of claim 4, further comprising a boiler or heat exchanger in heat exchange relation with the exhaust line for transferring heat from the exhaust line to a heat exchange fluid.

6. The system of claim 1 wherein the compressed air storage chamber is partially enclosed by a flexible diaphragm capable of maintaining constant air pressure within the compressed air storage chamber.

7. The system of claim 1, further comprising a boiler or heat exchanger in heat exchange relation with the engine for transferring heat generated by the engine to a heat exchange fluid.

8. A method for generating heat in a subsea environment, comprising:

a. providing air from a compressed air storage chamber within an outer shell located in a subsea environment to a combustor located on the ocean floor or at the bottom of an offshore oil well;

b. delivering a fuel to the combustor;

c. combusting a mixture of the air and the fuel in the combustor thereby generating heat;

d. removing exhaust gas from the combustor through an exhaust line having an exhaust port located below the water surface; and e. refilling the compressed air storage chamber periodically over time through the exhaust line.

9. The method of claim 8 wherein the heat generated is utilized to heat heavy oil.

10. The method of claim 8 wherein the heat generated is utilized for thermal hydrocarbon recovery.

11. The method of claim 8 wherein the heat generated is utilized to generate steam.

12. The method of claim 8 wherein the combustor provides power to at least one of a gas turbine, a positive displacement engine, a thermoelectric generator or a Stirling engine.

13. A system for generating power in a subsea environment, comprising:

a. a compressed air storage chamber located on the ocean floor in fluid communication with a compressed air source;

b. an outer shell located on the ocean floor enclosing a portion of the compressed air storage chamber;

c. an engine located on the ocean floor having an inlet in fluid communication with the compressed air storage chamber; and d. an exhaust line in fluid communication with the engine and having an exhaust port at the end thereof for removing exhaust gas from the engine, wherein the exhaust port is located below the water surface at a vertical position between the engine and the water surface;

wherein the engine is an air engine and a pressure differential between the ocean floor and the vertical position allows the engine to produce a maximum power output.

14. The system of claim 13, wherein the system is capable of generating at least about 4.3 kW of power continuously over a 100 day period resulting from a differential pressure between the ocean floor and the vertical position of the exhaust port.

* * * * *